(12) United States Patent
Bates et al.

(10) Patent No.: US 8,134,560 B2
(45) Date of Patent: Mar. 13, 2012

(54) METHOD FOR AVATAR WANDERING IN A COMPUTER BASED INTERACTIVE ENVIRONMENT

(75) Inventors: Cary L. Bates, Rochester, MN (US); Bryan M. Logan, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 853 days.

(21) Appl. No.: 12/179,731

(22) Filed: Jul. 25, 2008

(65) Prior Publication Data
US 2010/0020085 A1    Jan. 28, 2010

(51) Int. Cl.
*G06T 13/00* (2011.01)
(52) U.S. Cl. ..................................... 345/474; 345/473
(58) Field of Classification Search ................. 345/474
See application file for complete search history.

(56) References Cited

U.S. PATENT DOCUMENTS

2007/0149289 A1* 6/2007 Nickell et al. ............... 463/42
2007/0156664 A1* 7/2007 Norton et al. ................. 707/3

* cited by examiner

*Primary Examiner* — Xiao M. Wu
*Assistant Examiner* — Maurice L McDowell, Jr.
(74) *Attorney, Agent, or Firm* — Cantor Colburn LLP

(57) ABSTRACT

A method for avatar wandering in a computer based interactive environment including for each avatar within a range of a current avatar, obtaining profiles of a user represented by the avatar, for each profile of the user represented by the avatar that has a same profile type as a profile of a user represented by the current avatar, comparing the profiles for matching data, computing a match score for the avatar based on the matching data, and moving the current avatar toward the avatar that has a greatest match score.

4 Claims, 3 Drawing Sheets

METHOD FOR AVATAR WANDERING IN A COMPUTER BASED INTERACTIVE ENVIRONMENT

BACKGROUND

1. Field of the Invention

This invention relates generally to computer based interactive environments, and particularly to a method for avatar wandering in a computer based interactive environment.

2. Description of Background

Computer based interactive environments (also known as simulated or virtual environments, worlds, etc.) have been growing in popularity since the introduction of computer networking and the Internet. These environments provide social interaction, entertainment, etc. for people of various ages, backgrounds, interests, etc. Most computer based interactive environments include a graphical representation of a user known as an "avatar", which may have numerous forms, characteristics, capabilities, etc. For example, an avatar may be a two or three dimensional computer based depiction of a person, animal, animated character, object, etc. with capabilities to move, communicate, etc. Usually, a user can control an avatar via computer input devices such as a keyboard or mouse to move the avatar and perform other capabilities. However, since most computer based interactive environments include numerous avatars, the task of a user to seek out and move their avatar toward another avatar whose user has desirable characteristics for interaction can be burdensome. Therefore, it is desirable to have a method for avatar wandering in a computer based interactive environment that seeks out and moves a user's avatar toward another avatar whose user has such desirable characteristics for interaction.

SUMMARY

A method for avatar wandering in a computer based interactive environment is provided. An exemplary embodiment of the method includes for each avatar within a range of a current avatar, obtaining profiles of a user represented by the avatar, for each profile of the user represented by the avatar that has a same profile type as a profile of a user represented by the current avatar, comparing the profiles for matching data, computing a match score for the avatar based on the matching data, and moving the current avatar toward the avatar that has a greatest match score.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

According to exemplary embodiments of the invention described herein, a method for avatar wandering in a computer based interactive environment is provided. In accordance with such exemplary embodiments, a method is provided to seek out and move a user's avatar toward another avatar whose user has desirable characteristics for interaction.

Figure 1:
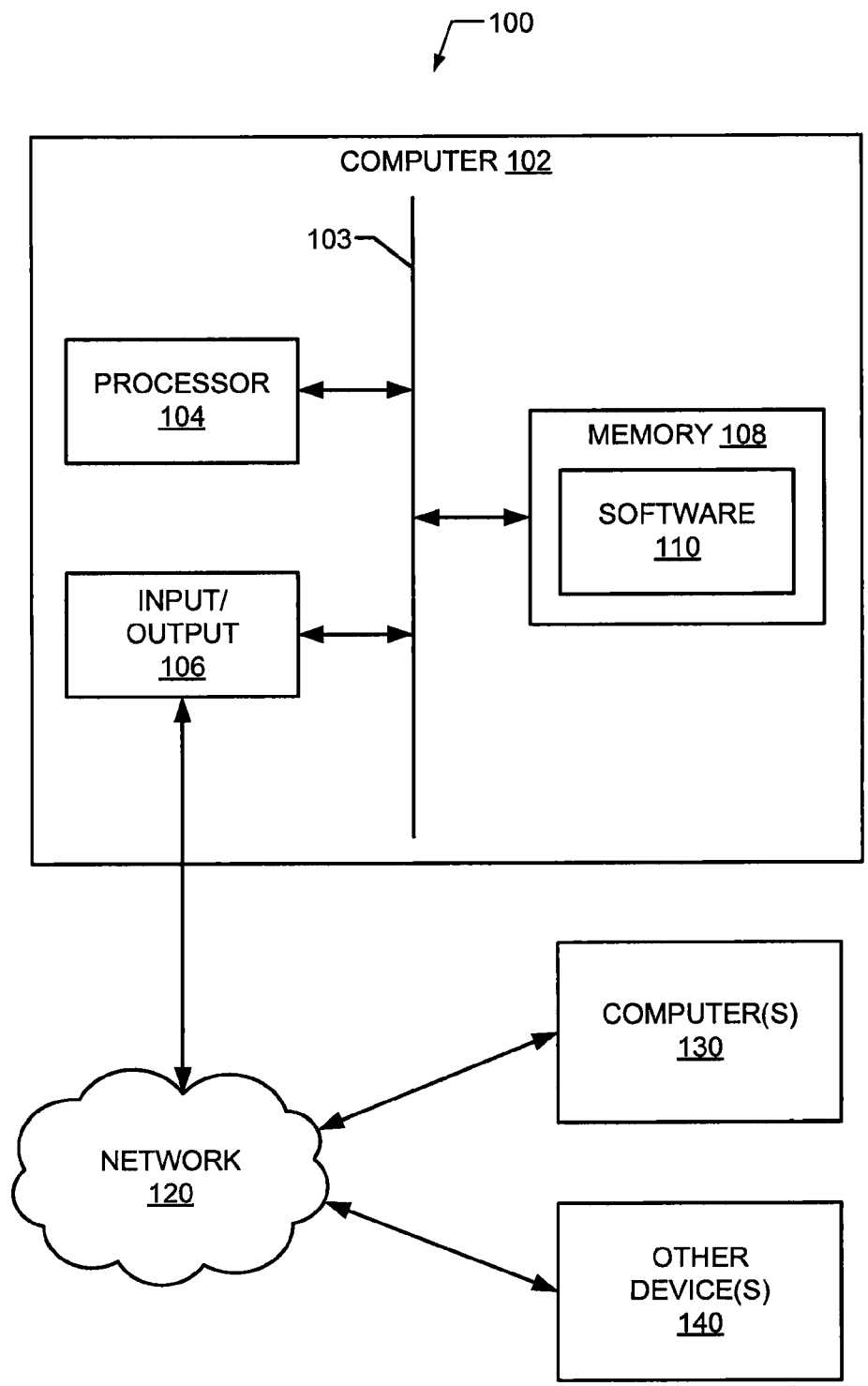
FIG. 1 is a block diagram illustrating an example of a computer system including an exemplary computing device configured to provide avatar wandering in a computer based interactive environment.

Turning now to the drawings in greater detail, wherein like reference numerals indicate like elements, FIG. 1 illustrates an example of a computer system 100 including an exemplary computing device ("computer") 102 configured to provide avatar wandering in a computer based interactive environment. In addition to computer 102, exemplary computer system 100 includes network 120, computing device(s) ("computer(s)") 130, and other device(s) 140. Network 120 connects computer 102, computer(s) 130, and other device(s) 140 and may include one or more wide area networks (WANs) and/or local area networks (LANs) such as the Internet, intranet(s), and/or wireless communications network(s). Computer(s) 130 may include one or more other computers, e.g., that are similar to computer 102 and which, e.g., may operate as a server device, client device, etc. within computer system 100. Other device(s) 140 may include one or more other computing devices, e.g., one or more storage devices, databases, etc. Computer 102, computer(s) 130, and other device(s) 140 are in communication via network 120, e.g., to communicate data between them.

Exemplary computer 102 includes processor 104, input/output component(s) 106, and memory 108, which are in communication via bus 103. Processor 104 may include multiple (e.g., two or more) processors, which may, e.g., implement pipeline processing, and may also include cache memory ("cache") and controls (not depicted). The cache may include multiple cache levels (e.g., L1, L2, etc.) that are on or off-chip from processor 104 (e.g., an L1 cache may be on-chip, an L2 cache may be off-chip, etc.). Input/output component(s) 106 may include one or more components that facilitate local and/or remote input/output operations to/from computer 102, such as a display, keyboard, modem, network adapter, ports, etc. (not depicted). Memory 108 includes software 110 configured to provide avatar wandering in a computer based interactive environment, which is executable, e.g., by computer 102 via processor 104. Memory 108 may include other software, data, etc. (not depicted).

Figure 2:
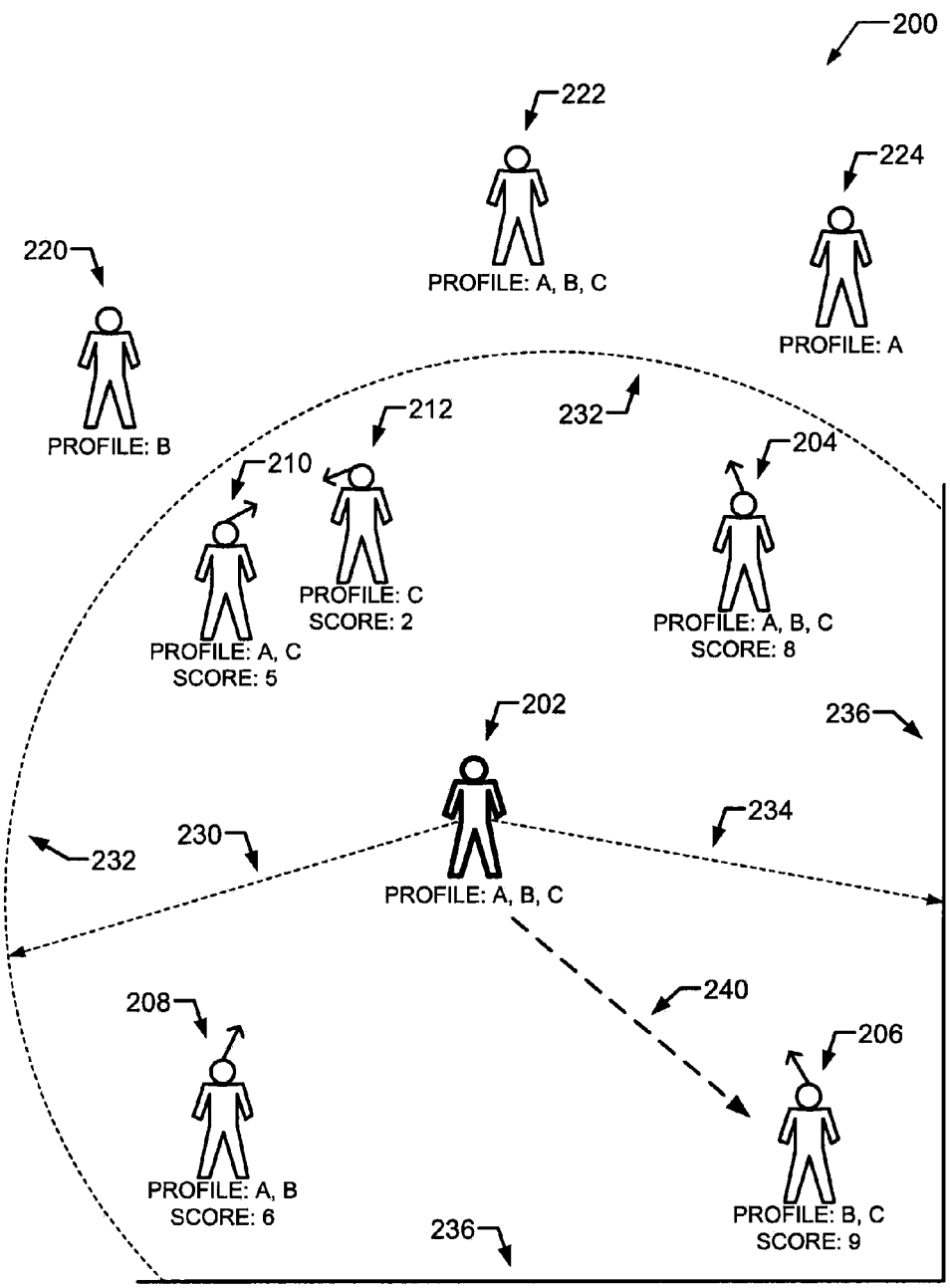
FIG. 2 is a block diagram illustrating an example of avatar wandering in a computer based interactive environment provided, for example, by the exemplary computing device of FIG. 1.

FIG. 2 illustrates an example of avatar wandering in a computer based interactive environment 200 provided, for example, by exemplary computer 102 of FIG. 1. It should be understood that a computer based interactive environment implemented in accordance with exemplary embodiments of the invention may include numerous elements, features, characteristics, etc. that are not depicted in FIG. 2 for simplicity of the following description. Examples of such computer based interactive environments include so-called simulated or virtual environments, worlds, etc. that are accessible via a computer connected to the Internet and/or other communications mediums. Exemplary environment 200 includes a plurality of avatars 202, 204, 206, 208, 210, 212, 220, 222, 224. As known, an avatar is a computer based representation of a user, participant, etc. in a computer based interactive environment and may have numerous forms, characteristics, capabilities, etc. For example, an avatar may be a two or three dimensional computer based depiction of a person, animal, animated character, object, etc. with capabilities to move, communicate, etc.

Each user represented by an avatar 202, 204, 206, 208, 210, 212, 220, 222, 224 in environment 200 may have created (or otherwise provided) one or more profiles, which may be associated with (e.g., obtainable via or by reference to) the respective avatar 202, 204, 206, 208, 210, 212, 220, 222, 224. Such profiles may be related to various subjects, such as dating, genealogy, socializing, gaming, etc., and are often created for user participation in computer based interactive environments such as environment 200. The profiles may include data regarding a subject, such as personal information, characteristics, preferences, interests, etc., which can be compared among profiles that are, e.g., of the same or similar type. For example, a dating profile of a first user associated with an avatar may be compared with a dating profile of a second user associated with another avatar. In the exemplary environment 200, profiles "A", "B", and/or "C" are listed for each avatar 202, 204, 206, 208, 210, 212, 220, 222, 224 to represent exemplary profiles (and/or types of profiles) regarding the respective users. However, it should be understood that there may be one or more (e.g., numerous) profiles associated with each avatar 202, 204, 206, 208, 210, 212, 220, 222, 224.

At least one avatar in environment 200 may be considered a current avatar, e.g., avatar 202. Current avatar 202 is, e.g., the avatar that represents a user of computer 102 who is accessing environment 200. Other avatars 204, 206, 208, 210, 212, 220, 222, 224 may be a current avatar with respect to other computers 130. As further discussed below, current avatar 202 includes a range in which other avatars in environment 200 may be considered for interaction. This range may be, e.g., a radial distance 230 from current avatar 202 (e.g., defining a virtual boundary 232) or an extent 234 to a boundary 236 adjacent to current avatar 202. Boundary 236 may be e.g., a border, barrier, obstacle, etc. such as a wall, fence, mountain, cliff, etc. As further discussed below, avatars 204, 206, 208, 210, 212 that are within a range 230, 234 of current avatar 202 can be assigned a score that is computed based on a comparison for matching data between profiles of current avatar 202 and in-range avatars 204, 206, 208, 210, 212. Furthermore, current avatar 202 may be moved toward an avatar (e.g., avatar 206 along path 240) for interaction that has the highest computed score. It should be understood that range 230, 234 and path 240 may have various measures, ranging from very small to very large depending on the scale and other factors, features, etc. of environment 200.

Figure 3:
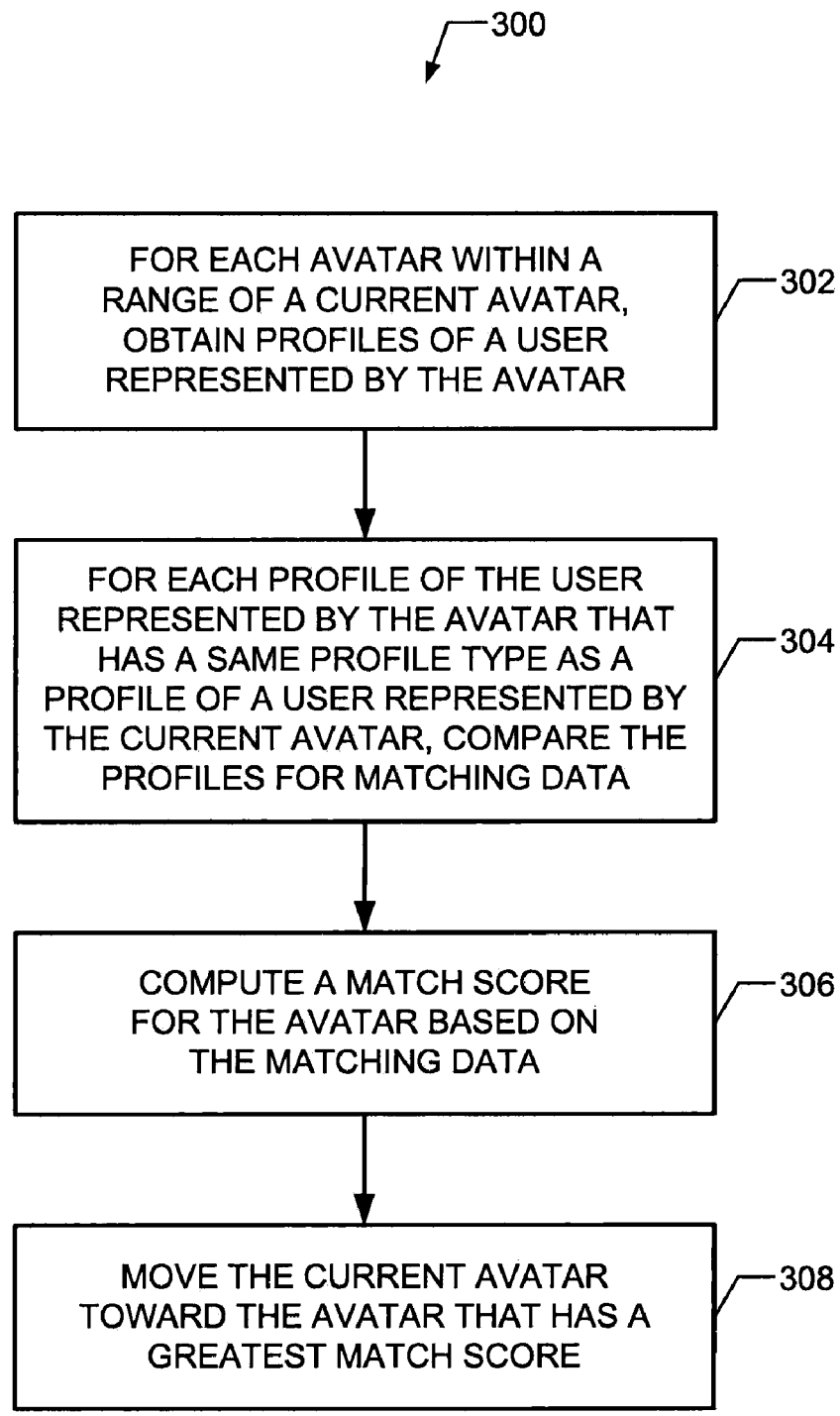
FIG. 3 is a flow diagram illustrating an example of a method for avatar wandering in a computer based interactive environment, which is executable, for example, on the exemplary computing device of FIG. 1.

FIG. 3 illustrates an example of a method 300 for avatar wandering in a computer based interactive environment, which is executable, for example, on the exemplary computer 102 of FIG. 1 (e.g., as a computer program product). Exemplary method 300 may also describe an exemplary interaction of current avatar 202 with other avatars 204, 206, 208, 210, 212, 220, 222, 224 in exemplary computer based interactive environment 200. In block 302, for each avatar 204, 206, 208, 210, 212 within a range 230, 234 of a current avatar 202, profiles of a user represented by the avatar are obtained. These profiles may be stored on computer 102, one or more other computers 130, and/or other devices 140 (such as a database or storage device).

In block 304, for each profile of the user represented by the avatar that has a same profile type as a profile of a user represented by the current avatar, the profiles are compared for matching data. For example, as discussed above, a dating profile of the current avatar 202 may be compared to dating profiles of other in-range avatars 204, 206, 208, 210, 212 that have such dating profile. Profiles and profile data may be formatted, stored, etc. in numerous manners and also compared using numerous methods, which may be known or otherwise apparent based on this disclosure. For example, the profiles may be organized into tables, arrays, etc. within databases that can be queried, compared, etc.

In block 306 a match score for the avatar is computed based on the matching data. For example, with reference to FIG. 2, current avatar 202 is depicted to include profile types A, B, C, while the other in-range avatars 204, 206, 208, 210, 212 include one or more of such profile types as also depicted. For each in-range avatar 204, 206, 208, 210, 212, profiles of the same type are compared for matching data and a match score is computed based on the results. For example, an in-range avatar 204, 206, 208, 210, 212 that has most or all matching profile data may be assigned a score of "10" while an in-range avatar 204, 206, 208, 210, 212 that has little or no matching profile data may be assigned a score of "0". Scores may fall in between such range as depicted, e.g., in FIG. 2 based on an amount of matching profile data ranging between all or none.

In block 308, the current avatar 202 is moved toward the avatar 206 that has a greatest match score (in the example of FIG. 2, a score of "9"). Depending on the nature of the avatar and the environment 200, the avatar may be caused to walk, run, crawl, fly, etc. toward the high score avatar 206, e.g., via a path 240. In some embodiments, the match score of the avatar is reduced if the avatar is facing away from the current avatar or if the avatar is interacting with another avatar. For example, with respect to FIG. 2, the score of avatar 204 may be reduced (e.g., by one) because it is facing (looking, etc.) away from current avatar 202 (as depicted). As another example, the scores of avatars 210, 212 may be reduced because these avatars 210, 212 are interacting with each other (as depicted). In some embodiments, blocks 302, 304, 306, and/or 308 may be implemented when a user selects a so-called "wander" (or similar) mode in order to interact with other avatars (and thus users) with the assistance (e.g., automatic, prompted, etc.) of computer 102.

In some embodiments, the match score for each avatar within the range of the current avatar may be computed (e.g., recomputed) after moving the current avatar a distance or for a period of time, where the match score of the avatar is reduced if the avatar is located in a position that is more than an angular distance from a direction in which the current avatar is moving. For example, the match scores of in-range avatars 204, 206, 208, 210, 212 may be computed again after current avatar 202 is moved a certain distance or for a certain period of time (e.g., along path 204) to determine whether the current avatar 202 should be moved toward another avatar instead. This recomputing may take into consideration changes in conditions that occur to in-range avatars such as a change in the facing direction or in the interaction with another avatar, and may also take into consideration avatars that have moved in or out of the range 230, 234 of the current avatar 202 after the current avatar begins moving. Additionally, if a favorable avatar comes into range in a position that is more than a certain angular distance from the direction in which the current avatar is moving (e.g., greater than +/−90 degrees), the score of the avatar can be reduced to prevent an indeterminate or non-productive movement (e.g., back and forth) of the current avatar. Additionally, in some embodiments, the avatar that has the highest score may be highlighted (e.g., emphasized by some change or addition to its appearance, such as bolding, coloring, flagging, etc.). Furthermore, in some embodiments, the basis (e.g., the relevant profile data) of the match score of one or more of in-range avatars 204, 206, 208, 210, 212 may be output (e.g., displayed in environment 200), which may, e.g., be used to confirm desired interaction characteristics.

Exemplary computer system 100, computer 102, and computer based interactive environment 200 are illustrated and described with respect to various components, modules, etc. for exemplary purposes. It should be understood that other variations, combinations, or integrations of such elements that provide the same features, functions, etc. are included within the scope of embodiments of the invention.

The flow diagram described herein is just an example. There may be many variations to this diagram or the blocks (or operations) thereof without departing from the spirit of embodiments of the invention. For instance, the blocks may be performed in a differing order, or blocks may be added, deleted or modified. All of these variations are considered a part of the claimed invention. Furthermore, although an exemplary execution of the flow diagram blocks is described with respect to the exemplary computer system 100, computer 102, and computer based interactive environment 200, execution of the flow diagram blocks may be implemented with other hardware and/or software architectures that provide the same features, functions, etc. in accordance with exemplary embodiments of the invention.

Exemplary embodiments of the invention can be implemented in hardware, software, or a combination of both. Those embodiments implemented in software may, for example, include firmware, resident software, microcode, etc. Exemplary embodiments of the invention may also be implemented as a computer program product accessible from a computer-usable or computer-readable medium providing program code for use by or in connection with a computer or other instruction execution system. In this regard, a computer-usable or computer-readable medium can be any apparatus that can contain, store, communicate, propagate, or transport the program for use in connection with the instruction execution system, apparatus, or device.

The computer-usable or computer-readable medium can be an electronic, magnetic, optical, electromagnetic, infrared, or semiconductor system (apparatus, device, etc.) or a propagation medium. Examples of a computer-readable medium include a semiconductor or solid state memory, magnetic tape, a removable computer diskette, a random access memory (RAM), a read-only memory (ROM), a rigid magnetic disk, or an optical disk. Some current examples of optical disks include compact disk-read only memory (CD-ROM), compact disk-read/write (CD-R/W), or digital video disk (DVD).

A data processing system suitable for storing and/or executing program code can include at least one processor coupled directly or indirectly to memory elements through a system bus. The memory elements can include local memory employed during actual execution of the program code, bulk storage, or cache memories that provide temporary storage of at least some program code to reduce the number of times the code needs to be retrieved from bulk storage during execution.

Input/output (I/O) devices (e.g., keyboards, displays, pointing devices, etc.) can be coupled to the data processing system either directly or through intervening I/O controllers. Network adapters may also be coupled to the data processing system to allow the system to be coupled to other data processing systems or remote printers or storage devices through intervening private or public networks. Telephonic modems, cable modems, and ethernet cards are a few examples of the currently available types of network adapters.

While exemplary embodiments of the invention have been described, it will be understood that those skilled in the art, both now and in the future, may make various improvements and enhancements which fall within the scope of the claims that follow. These claims should be construed to maintain the proper protection for the invention first described.

What is claimed is:

1. A method for avatar wandering in a computer based interactive environment, comprising:
    for each avatar within a range of a current avatar, obtaining profiles of a user represented by the avatar;
    for each profile of the user represented by the avatar that has a same profile type as a profile of a user represented by the current avatar, comparing the profiles for matching data;
    computing a match score for the avatar based on the matching data;
    moving the current avatar toward the avatar that has a greatest match score; and
    computing the match score for each avatar within the range of the current avatar after moving the current avatar a distance or for a period of time, wherein the match score of the avatar is reduced if the avatar is located in a position that is more than an angular distance from a direction in which the current avatar is moving.

2. The method of claim 1, wherein the match score of the avatar is reduced if the avatar is facing away from the current avatar or if the avatar is interacting with another avatar.

3. The method of claim 1, wherein:
    the range is a radial distance from the current avatar or an extent to a boundary adjacent to the current avatar; and
    the profile type is dating, genealogical, socializing, or gaming.

4. The method of claim 1, wherein the avatar that has the greatest match score is highlighted.

* * * * *